United States Patent [19]

Lénárt

[11] 4,243,929
[45] Jan. 6, 1981

[54] RECHARGING ACCUMULATOR BATTERIES

[75] Inventor: Tibor Lénárt, Älvsjö, Sweden

[73] Assignee: Aktiebolaget Multilab, Sweden

[21] Appl. No.: 870,072

[22] Filed: Jan. 17, 1978

[30] Foreign Application Priority Data

Jan. 19, 1977 [SE] Sweden ............................. 7700535
Jun. 8, 1977 [SE] Sweden ............................. 7712063

[51] Int. Cl.³ ............................................. H02J 7/04
[52] U.S. Cl. ........................................ 320/23; 320/32; 320/39
[58] Field of Search ................................ 322/22–24, 322/32, 39, 40; 320/21

[56] References Cited

U.S. PATENT DOCUMENTS

| 3,517,295 | 6/1970 | Lapuyade | 320/39 X |
| 3,553,561 | 1/1971 | Lesher | 320/39 X |
| 3,781,630 | 12/1973 | Ballman | 320/21 |
| 3,854,082 | 12/1974 | Nasby et al. | |

Primary Examiner—Robert J. Hickey
Attorney, Agent, or Firm—Holman & Stern

[57] ABSTRACT

The voltage of a unit for recharging an accumulator battery is reduced to a low level when the battery is in a charged state as determined by a predetermined fall in the trickle charging current. When the charged state of the battery is no longer maintained as determined by a fall in battery voltage below the low voltage level and a predetermined increase in trickle charging current, the voltage of the unit changes to a high level.

10 Claims, 4 Drawing Figures

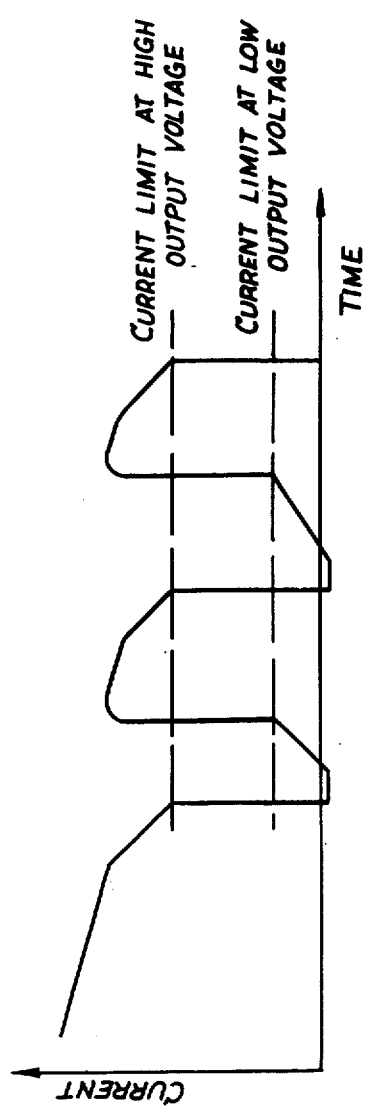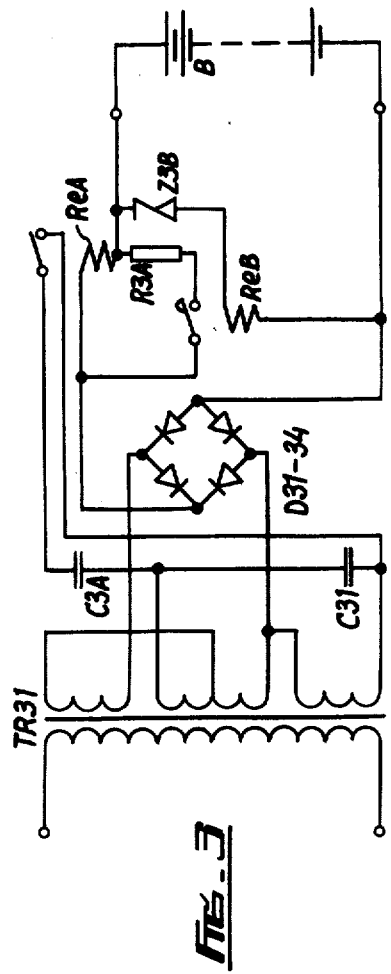

RECHARGING ACCUMULATOR BATTERIES

The present invention relates to the recharging of accumulator batteries.

For recharging accumulator batteries for stationary use or for use of vehicles, charging units are frequently used which are of the so-called constant voltage type, implying that the charging current is considerably reduced when the terminal voltage of the battery approaches the open-circuit voltage of the charging unit.

The current required to maintain a certain cell voltage for a battery is called the trickle current. Its magnitude depends to a very great extent on the condition of the battery. A fresh battery only requires a low current to maintain the certain cell voltage, whereas a used battery needs a considerably higher current to maintain such voltage.

However, the contribution made by the magnitude of the trickle current to the capacity of the battery is very small, particularly in the case of used batteries, where the current acceptivity is relatively high at the same time as the capacity is relatively low. Indeed, a high trickle charging current can give rise to disadvantages during charging, such as the risk of boiling, sulphating, formation of oxygen and hydrogen gas and corrosive vapours, and overheating of the battery.

Accordingly, the indication is that a controlled reduction of the trickle charging current would give a lower energy consumption during charging and would be less harmful for the battery whilst resulting in a negligible capacity reduction. The trickle charging current can be reduced in several different ways, e.g. by connecting a higher series resistance in the circuit, or by lowering the source voltage of the charging unit. Neither of these methods however allow for the affect on the charging process of disturbing factors, such as variation of the mains voltage, the temperature of the battery and so on.

An object of the present invention is to provide a charging unit for effecting a controlled reduction of the trickle charging current, wherein disadvantages of the kind mentioned above can avoided or at least minimised.

According to the invention therefore there is provided a charging unit for recharging an accumulator battery, characterised in that said unit incorporates control circuitry operative to impart stepwise changes in use to the charging process, partly by lowering the output voltage of the unit to a lower level when the charging current sinks below a predetermined minimum value, and partly by raising the output voltage of the unit to a higher level when the battery voltage has sunk to said lower level, and the charging current reaches a predetermined maximum value at the lower level.

Considerable advantages can be obtained by changing the output voltage of the charging unit to a lower level at a predetermined low value of the trickle charging current, e.g. when the terminal voltage of the battery has reached its maximum value and only a low trickle charging current is flowing. Said change of the output voltage of the unit may be such that the output voltage is less than the terminal voltage of the baterry whereby the current falls to zero, or rather falls to a very low current, utilised for sensing the terminal voltage of the battery, which flows from the battery to the charging unit. The battery is then not charged for a certain period of time. During this period of time no energy is wastefully utilised for maintaining an unnecessarily high terminal voltage. Also, the battery acid has time to reach equilibrium and the battery has time to cool. Of course, the weight and composition of the battery acid is changed, and consequently also the terminal voltage of the battery, if the battery is not charged for a prolonged period of time. This self-discharge of the battery lowers its capacity, and reduces its terminal voltage. When the terminal voltage of the battery sinks below the low level output voltage of the charging unit, trickle charging current starts flowing again. This current is considerably lower than the current needed for maintaining a high terminal voltage, and most often it is sufficient to compensate for the self-discharge, whereby the capacity of the battery can be maintained. In the event that the battery is loaded or a high self-discharge occurs, this results after some time in a slightly increased trickle current. Such increase in trickle current indicates that appreciable capacity reduction has occurred and compensation is required. This compensation is effected in that when the trickle charging current reaches a predetermined value at the said lower voltage level, the unit commences a new charging cycle having the following phases:

(a) The battery is recharged to a predetermined "high" terminal voltage.

(b) The charging current is allowed to fall in accordance with the requirements of the battery at the "high" terminal voltage.

(c) The output voltage of the unit is changed to the "low" value, whereby charging ceases.

(d) The charging current is supervised and a new charging cycle commences when the charging current reaches a certain predetermined value at the low voltage level.

With this arrangement the total energy consumption for maintaining a certain battery capacity can be lower than with a continuous trickle charging current. Furthermore there is the possibility of adjusting the charging process manually without adversely affecting the charging. New batteries have a low self-discharge and need a low trickle charging current in so far as they can keep a relatively high terminal voltage after having been fully charged. This is not the case with used batteries. The terminal voltage after full charging sinks more rapidly then with new batteries, whereas full charging necessitates the same high terminal voltage as for new batteries. When charging with a continuous trickle charging current at constant voltage more current is fed into a used battery than into a new one, although the current demand at a lower voltage level is close to the current demand of a new battery.

With the arrangement of the invention it is possible to provide for the charging conditions to be regulated in dependence on the condition of the battery by manually varying the current limits at which the unit shall change its voltage level.

With a used battery the current demand of which is unnecessarily great at the high terminal voltage, a higher current limit can be selected at which the voltage level is changed downwardly for reducing the trickle charging current, whereas the current limits for changing the voltage levelupwardly can be fixed.

Full charging is then effected at the higher voltage level and may proceed as fast as with new batteries, but the trickle charging process is not prolonged unnecessarily due to the higher, manually set, current level limit. At the lower voltage level the current demand is considerably lower; the rest period can be assumed to be as long as with fresh batteries before a change of the voltage level upwardly takes place.

Accordingly, with the arrangement of the invention the battery is fully charged, there is then a change of voltage level downwardly to prevent an unnecessarily high trickle charging current during an unnecessarily long time, and the voltage level is changed upwardly to ensure a maintained capacity for the battery.

The invention will now be described further by way of example only and with reference to the accompanying drawings, in which:

FIG. 2 illustrates the variation of the charging current with the unit of FIG. 1; and FIGS. 3 and 4 are circuit diagrams of further embodiments.

Figure 1:
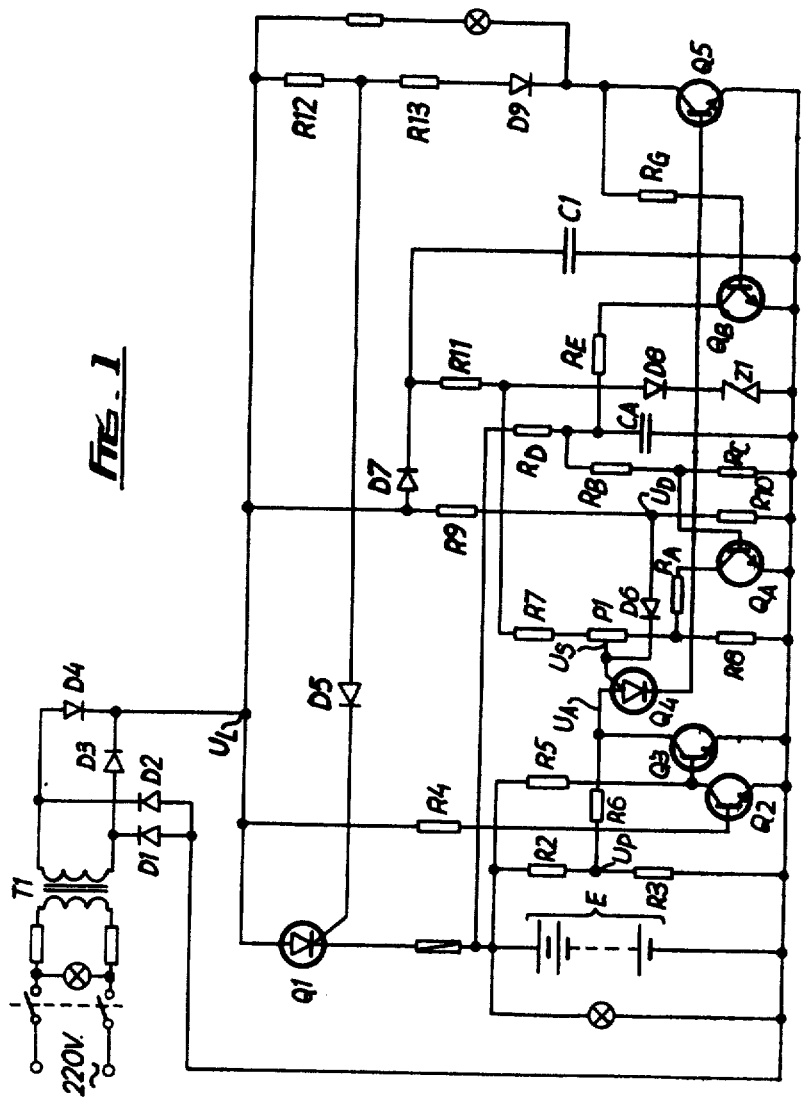
FIG. 1 is a circuit diagram of one form of a unit according to the invention.

The circuit of FIG. 1 incorporates a full wave rectifier $D_1$–$D_4$ connected to a.c. mains supply via a transformer T1. The output of the rectifier is connected to an accumulator battery E via a controlled rectifier Q1. Certain parts of the circuit are identical with those of the circuit disclosed in Swedish Pat. No. 356,854. These portions are not described in detail herein and reference is made to said Swedish Patent Specification for further details thereof.

The said circuit of the Swedish Patent Specification is supplemented with a shunt circuit connected to the voltage divider R7, P1 and R8, and with a capactior $C_A$ with associated charging and discharging components.

The shunt circuit consists of a resistor $R_A$ and a transistor $Q_A$ with associated base drive resistors $R_B$ and $R_C$.

As a charging component for the capacitor $C_A$ there is a resistor $R_D$ connected to the battery. As discharging components for the capacitor $C_A$ there are a transistor $Q_B$ and a collector resistor $R_E$ connected between the capacitor $C_A$ and the charging resistor $R_D$. Between the base of the transistor $Q_B$ and the collector of a transistor Q5 of the charging circuit there is connected a resistor $R_G$. The transistor Q5 controls switching of the rectifier Q1.

The circuit portion described above operates in the following way.

At the beginning of the charging process $C_A$ is charged to the full battery voltage when the battery is first connected to the unit and the mains switch is switched on. Full battery voltage across $C_A$ results in the actuation of $Q_A$ to connect $R_A$ in parallel with R8. Initially therefore the unit commences operation whilst set at the lower voltage level hereinbefore discussed. Despite this, the charging current can be as high as when the unit is set at the high voltage level in so far as that the circuit does not affect the actual source voltage of the unit. At the beginning of the recharging process of a battery which is not fully charged Q5 is continuously blocked so that Q1 allows passage of a full charging current. The set voltage level does not change until the battery reaches the set high voltage level. $Q_B$ then opens since it receives control current via $R_E$, $C_A$ is discharged, $Q_A$ is blocked and the circuit passes into the higher voltage level, although still without influence on the charging current.

After the terminal voltage of the battery has reached the set high voltge level, Q4 and Q5 are forced to conduct initially for short time intervals and subsequently for longer time intervals. Q1 is blocked during corresponding time intervals and the charging current is consequently reduced to the value needed to maintain the set voltage level.

Due to the fact that the battery voltage is constant the charging current is now determined solely by the conducting and blocking time of Q5, i.e. of the quotient $t_{block}/t_{conduct}$. The same is true for the discharging current of $C_A$, which ceases every time Q5 is conducting. The voltage across $C_A$ thus rises with increase in conduction time of Q5 and the magnitude thereof is determined solely by the above mentioned quotient, since the discharge takes place at constant battery voltage via $R_E$.

The relationship between the charging current and the voltage across $C_A$ is inversely proportional, i.e. at low charging current the voltage across $C_A$ becomes high.

$Q_A$ senses the voltage across $C_A$ via the voltage divider $R_B$, $R_C$, which can be dimensioned so that $Q_A$ is actuated at a desired voltage across $C_A$, i.e. at a desired charging current. When $Q_A$ is actuated $R_A$ is connected in parallel to R8 as described above, whereby the reference voltage applied to Q4 is reduced corresponding to change of the unit to the lower voltage level. After this reduction, the prevailing battery voltage as compared by the transistor Q4 with the reference voltage is found to be too high and Q5 is actuated to switch off Q1 and stop feed of charging current pulses to the battery. The voltage across $C_A$ is therefore further increased and the change to the lower voltage level is enhanced.

Without flow of charging current the terminal voltage of the battery falls and eventually it falls also below the said lower voltage level. Thereby Q4 and Q5 cause Q1 to conduct whereby charging current starts flowing. At the same time $C_A$ is somewhat discharged and its voltage falls. The charging current is determined at this voltage level by the battery and its loading, if any. The current becomes as high as is needed to maintain the set lower voltage level at the battery. Also now the inversely proportional relationship between the charging current and the voltage over $C_A$ is valid. If the current demand of the battery is great the voltage over $C_A$ will sink below the level at which $Q_A$ changes from the conducting to the non-conducting state. Thereby the parallel circuit relationship between R8 and $R_A$ is destroyed and the reference voltage is increased to the original value. The unit changes again to the higher voltage level. The change is also in this case cumulative.

The transition between the lower voltage level and the higher one takes place at a lower charging current than when the transition takes place in the opposite direction.

This is due to the lower battery voltage that charges $C_A$. The above mentioned quotient between the blocking time and the conducting time can be lower, i.e. the discharging current of $C_A$ can be lower, to cause the voltage across $C_A$ to reduce to the change-over value if $R_D$ is connected to the lower voltage.

The upper voltage level is determined by the voltage divider R7–P1-R8, and the lower one by $R_A$ in combination with R8. At a determined relationship between the components included in the voltage divider $R_B$, $R_C$ the current limits are affected by the relationship between $R_D$ and $R_E$. If these two resistors each, or together, are replaced by a potentiometer the current limit can be continuously controlled.

The variation of the charging current with time is illustrated in FIG. 2. After the main charging process (that can be carried out with decreasing current magnitude, constant current magnitude, or a combination thereof) the charging process is changed to constant U, the charging current then falling with time. At a certain set low current, charging ceases, and starts again after a certain time of rest. With continued increase of the current a maximum value is obtained and a new charging process is started.

The same charging process can be obtained with the circuit of FIG. 3, in which the charging unit includes a transformer of the constant voltage type (ferroresonant transformer, parametrically connected transformer, and so on).

TR 31 is a ferroresonant transformer with compensation and neutralization windings giving a constant voltage and having current limiting properties. The AC voltage of the transformer is rectified by a diode bride D31–D34 and the resulting pulsating direct voltage is supplied to the battery B via a current relay ReA.

The terminal voltage of the battery is supervised by a voltage relay consisting of a zener diode Z3B and a relay ReB.

The voltage relay ReB is in a rest position when the battery is in a discharged condition. The current relay ReA is set to the lower current limit. Charging then starts in correspondence with the lower voltage level but the current demand of the battery is great and sufficient charging current flows even at this voltage to operate ReA.

The relay ReA when operated connects capacitors C3A and C31 in parallel, whereby the unit changes to the upper voltage level and the charging current increases further.

The voltage relay ReB functions immediately below the highest terminal voltage and the resistor R3A is connected in parallel with the coil of ReA, whereby its sensitivity is reduced to a certain current value, that is, the upper current limit. When the charging current falls below this current value ReB releases the C3A is disconnected from C31, whereby the unit changes its voltage level downwardly.

The charging process is discontinued and the battery voltage reduces. Also ReB releases eventually and disconnects R3A from the current relay, the sensitivity of which thereby increases.

When the charging current at this voltage level reaches the value at which ReA operates, the voltage level changes again and the process is repeated. The voltage levels of the unit can be set by means of C31 and C3A; the current values determining the changes are chosen by means of ReA and R3A.

Figure 4:
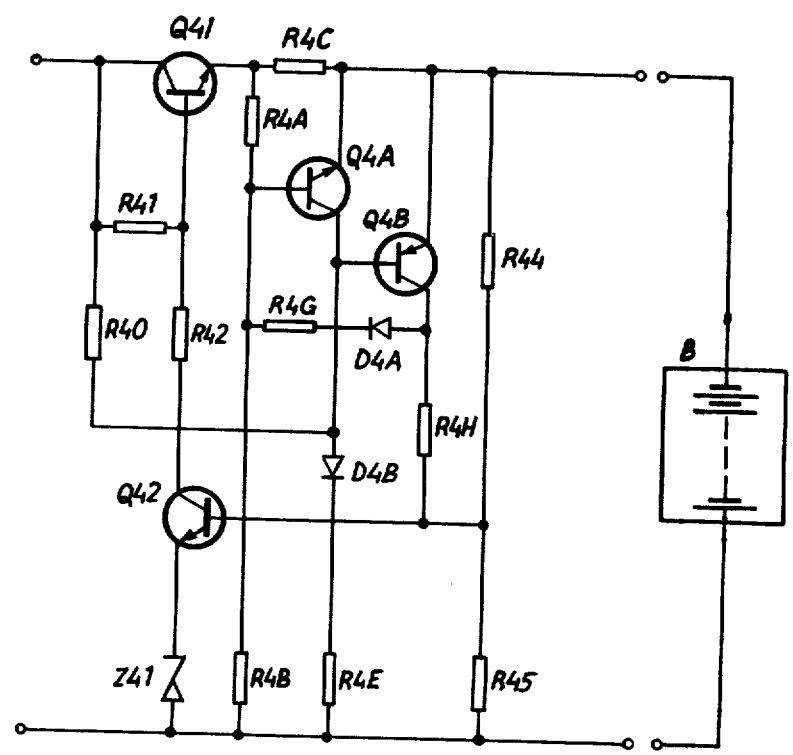

A further embodiment is shown in FIG. 4.

In this case the battery is charged by non-pulsating direct current. The circuit partly is a conventional series regulator consisting of a NPN-transistor Q41 as a series element, ana a NPN-transistor Q42 as a control element. The circuit is supplemented by Q4A and Q4B connected as shown.

Q4A is controlled by the sum of oppositely directed voltages across R4A and R4C. The voltage across the R4A is proportional to the output voltage of the unit, whereas the voltage over R4C is proportional to the charging current. When transistor Q4A is conducting it short-circuits the base-emitter path of the PNP-transistor Q4B which becomes blocked and renders the resistors R4H and R4G ineffective.

At the beginning of the charging process the charging current rises to such a high value that the voltage drop over R4C overcomes the voltage drop over R4A and actuates Q4A, the transistor Q4B then becoming blocked. The output voltage of the unit then becomes high and is determined by R44–R45 and the zener diode Z41.

When the battery has been charged to this voltage, the current is reduced by Q42 conducting more and Q41 being blocked more.

At a determined current (the uppercurrent limit) the voltage drop over R4C becomes so low that Q4A is blocked, the transistor Q4B then becoming conducting. The potential at the base of Q42 is raised due to R4H being connected in parallel with R44, whereby the output voltage of the unit is changed to the lower level. The charging current ceases. The negative bias across Q4A is reduced, partly due to the lower output voltage level, partly due to the fact that R4G is connected into circuit.

After some time, when the terminal voltage of the battery has sunk below the lower voltage level the charging current begins to flow. At a determined current value (the lower current limit) Q4A is actuated again, Q4B is blocked, the potential at Q42 is reduced, Q42 is blocked, Q41 is actuated, implying that the voltage level changes to the higher value and the charging process is repeated.

With the embodiments described above full charging can be achieved with careful energy saving trickle charging for the battery.

The invention is of course not limited to the embodiments described above.

What we claim is:

1. A battery charging circuit for recharging an accumulator battery with charging current comprising: a power supply for supplying power to the batttery to charge same, said supply being operable at two voltage levels; a current monitoring device for monitoring the charging current drawn by the battery; and a regulation circuit for receiving information from the current monitoring device and responding thereto to change the mode of operation of the power supply from the higher to the lower of said voltage levels when said charging current at said higher voltage level falls below a predetermined high current value, characterized by means in the regulation circuit for changing the mode of operation of power supply to said higher voltage level whenever said charging current, as sensed by said current monitoring device, rises above a predetermined low value, which is lower than said high current value, at said lower voltage level.

2. A circuit according to claim 1 wherein the power supply incorporates a rectifier bridge arranged to be supplied from a.c. source, characterized in that the power supply also incorporates an extra capacitance connected in parallel with the source via a switch of said regulation circuit.

3. A circuit according to claim 2, characterized in that the switch comprises contacts of a first relay which forms said current monitoring device, and a second relay is provided which is responsive to said higher voltage level to reduce the sensitivity of said first relay by connecting a resistor across the winding of the first relay.

4. A circuit according to claim 1, wherein said power supply provides a non-pulsating direct voltage via a collector-emitter path of a first transistor which is controlled by a second transistor, the base electrode of the second transistor being connected to an output of a first potential divider connected across the power supply output which is characterized in that there is provided a third transistor having an emitter-collector path, the direction of conduction of which is opposite to that of said first and said second transistors and which is connected between the power supply output and the base electrode of the second transistor via a first resistance, the base electrode of the third transistor being controlled by said regulation circuit.

5. A circuit according to claim 4, characterized in that said regulation circuit comprises a fourth transistor, the emitter-collector path of which is connected in parallel to the potential divider, the collector electrode of which is connected to the base electrode of the third transistor, and the base and emitter electrodes of which are connected to the emitter electrode of the first transistor via a second and third resistance respectively, said second resistance forming part of a second potential divider connected in parallel with the first potential divider, and said third resistance forming said current monitoring device.

6. A circuit according to claim 1, wherein said power supply is arranged to provide a voltage pulsating about the terminal voltage of the battery and is connected across the battery via a controlled rectifier, comparison circuit means for comparing the terminal voltage with a reference voltage at a potential divider only when the terminal voltage exceeds the pulsating voltage and, as a result of the comparison, bringing the rectifier to a conducting or non-conducting state and keeping it in such a state until the next comparison occurrence, characterized in that said current monitoring device comprises a capacitance which is connected via a charging circuit across the battery and controls the connection and disconnection of a shunting resistor across a portion of the potential divider.

7. A circuit according to claim 6, characterized in that connection of the shunt resistance is controlled by a shunting transistor.

8. A circuit according to claim 6, characterized in that the capacitance is provided with a discharging resistance in series with the collector-emitter path of a discharging transistor which is base-connected so as to be brought into the conducting state when the rectifier is conductive.

9. A circuit according to claim 6, characterized in that the charging current limits are continuously controllable.

10. A circuit according to claim 9, characterized in that charging and discharging resistances included in the charging and discharging circuits, respectively, form a potentiometer.

* * * * *